Jan. 9, 1934.    J. P. SPANG    1,942,499
MACHINE FOR CUBING MEAT
Filed Dec. 1, 1930    2 Sheets-Sheet 1

Inventor.
Joseph P. Spang
by Heard, Smith & Tennant
Attys.

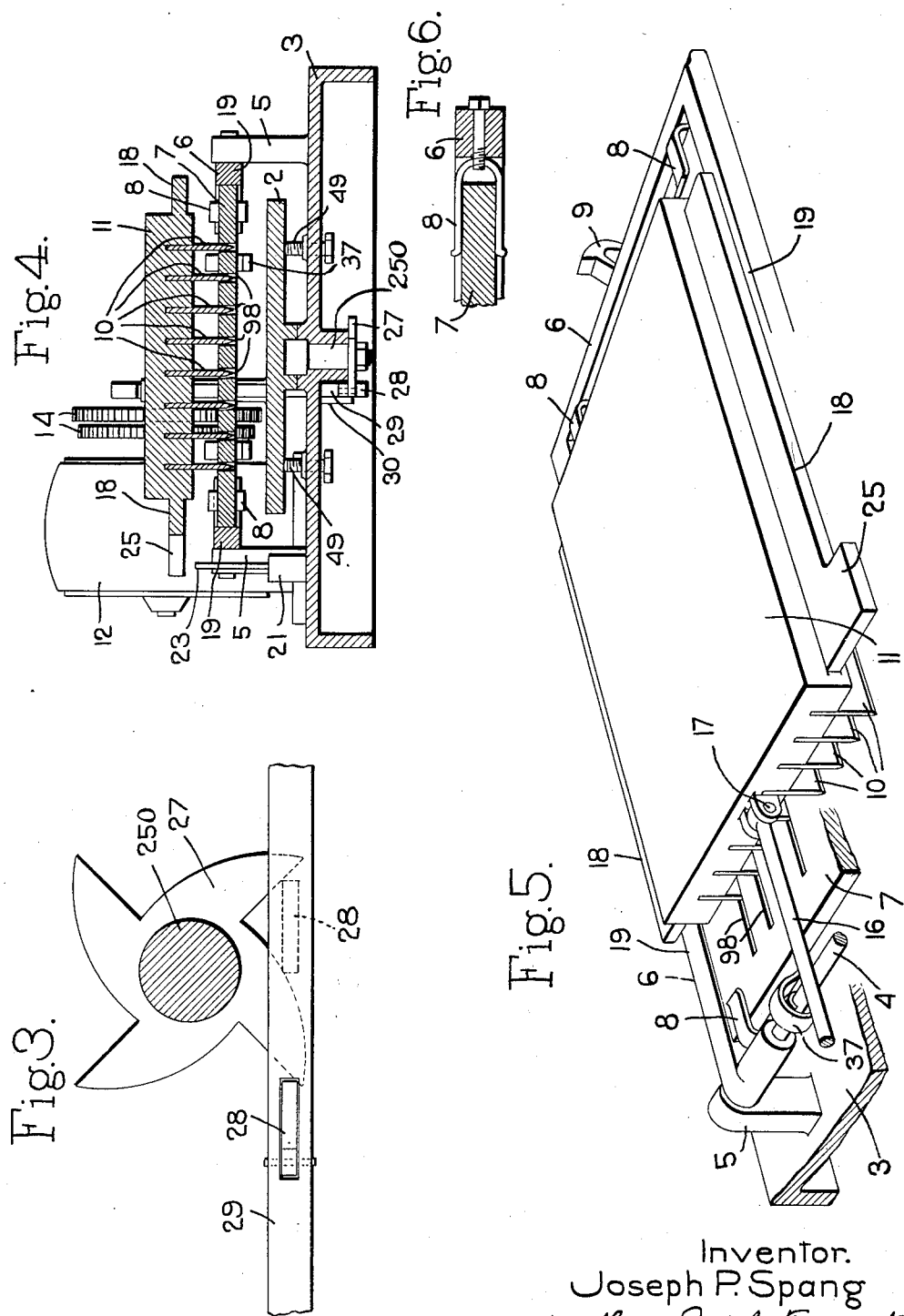

Patented Jan. 9, 1934

1,942,499

UNITED STATES PATENT OFFICE 1,942,499

MACHINE FOR CUBING MEAT

Joseph P. Spang, Quincy, Mass.

Application December 1, 1930. Serial No. 499,230

15 Claims. (Cl. 17—25)

This invention relates to a machine for cutting or slitting meat to produce what is known to the trade as "cube steak." In making this product a slice of meat is provided with two series of parallel slits which are cut from the top surface of the meat nearly to the bottom surface, the slits of one set being at right angles to those of the other.

One of the objects of the present invention is to provide an improved machine of this type in which the slitting knives are power actuated and also to provide a novel means for automatically rendering the knife-actuating means inoperative when the slits have been cut to the proper depth.

Another object of the invention is to provide a machine of this type in which the knife-actuating means will be automatically rendered operative by the act of clamping the meat onto the meat-supporting table.

A further object of the invention is to provide a novel means for automatically turning the meat-supporting table when one set of slits has been cut.

Other objects are to improve generally meat-cubing machines in the particulars which will be hereinafter more fully set forth.

In the drawings:

Fig. 3 is a detail view showing the devices for turning the meat-supporting table;

Fig. 4 is a section on the line 4—4, Fig. 2;

Fig. 5 is a fragmentary perspective view of the knife-supporting block and meat-clamping member;

Figure 6 is a section on the line 6—6, Fig. 2.

Figure 1:
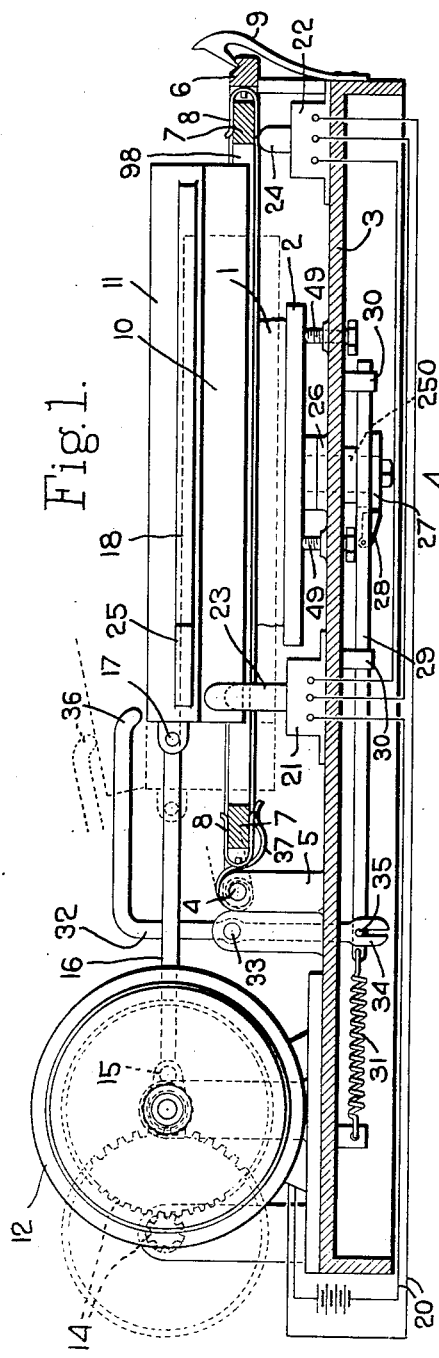
Fig. 1 is a sectional view of a meat-cubing machine embodying my invention taken on substantially the line 1—1, Fig. 2 but with the knife block in side elevation.
Figure 2:
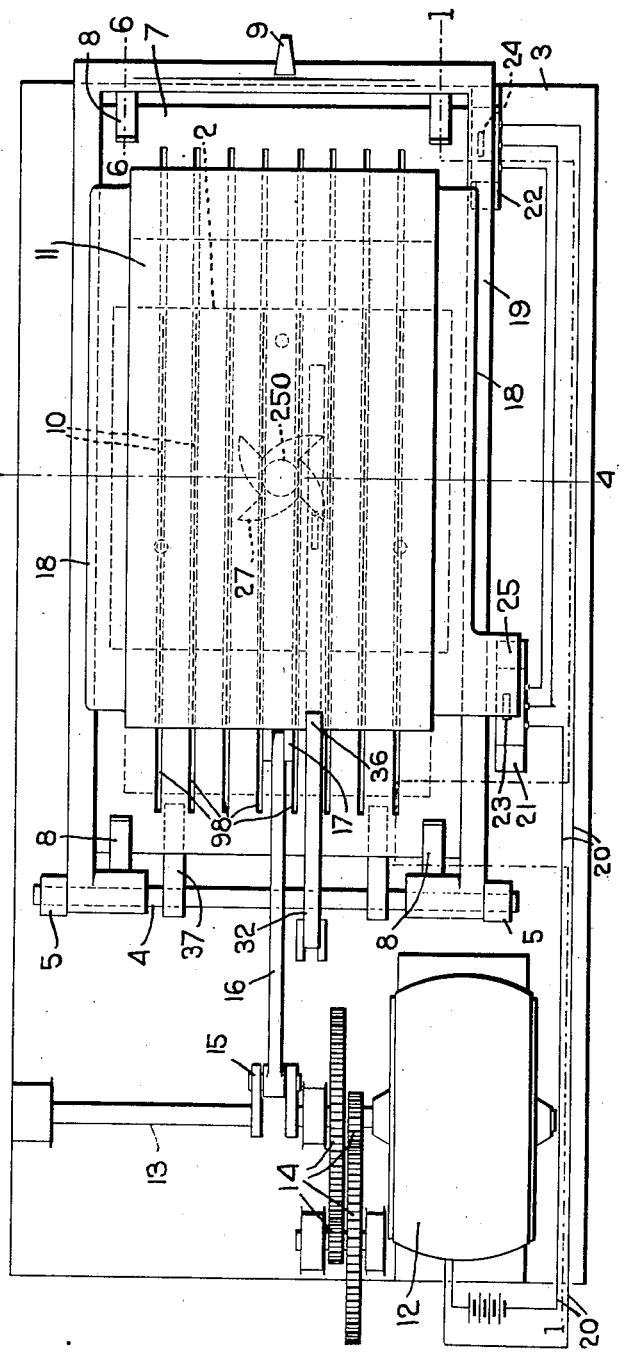
Fig. 2 is a top plan view of the machine.

In the machine herein shown the slice of meat to be "cubed", which is indicated at 1, is supported on a meat-supporting table 2 that is mounted on a suitable frame 3. The meat is held on the table 1 by means of a meat-clamping member which is pivoted at 4 to two posts 5 rising from the frame 3.

This meat-clamping member comprises a skeleton frame element 6 and a removable plate 7 which is provided with knife-receiving slits 98 to receive the knives presently to be referred to. This plate 7 is yieldingly supported by the skeleton frame 6 and for this purpose said plate is retained at its end between U-shaped clips 8 of resilient material that are secured to the frame 6. The frame 6 is held in its operative meat-clamping position by means of a latch 9 which is secured to the frame.

The knives by which the meat is cut are indicated at 10. These are in the form of knife blades that are secured in a head or block 11. These blades operate in the slots 98 of the plate 7 as best seen in Fig. 4.

The slits are cut in the meat by a reciprocating movement of the blades 10 and I have provided a motor for reciprocating the block. This motor is indicated at 12 and it is connected to a crank shaft 13 through suitable reducing gearing 14. The crank shaft 13 is provided with a crank 15 connected to one end of a pitman 16, the other end of which is pivoted to the block 11 at 17. With this construction the rotation of the crank shaft will reciprocate the blades thereby cutting the slits in the meat.

Means are provided to limit the downward movement of the blades so as to prevent them from cutting entirely through the slice of meat 1. As herein shown the knife block 11 is provided with wings 18 which overlie the side members 19 of the frame 6 and these wings are so designed and arranged that when they rest on the side members 19 of the frame 6 the cutting edge of the knife will be slightly above the table 2.

In order to place the meat in position to be cut the latch 9 is released from the frame 6 and the latter may be swung upwardly about the pivot 4. This gives access to the table 2 so that a slice of meat 1 can be placed thereon. The frame 6 may then be lowered into the position shown in Fig. 1 and when this is done the plate 7 will be clamped against the meat 1 and will hold it firmly on the table 2. The yielding clips 8 allow the plate 7 to yield slightly to accommodate slices of different thicknesses. When the meat has thus been clamped to the table the cutting edges of the knives will rest on the top of the meat and when the motor is started the reciprocating movement of the knives will rapidly cut the slits in the meat, the knives moving downwardly as the cutting operation proceeds. The wings 18 limit the downward movement of the knives and prevent the slice of meat from being cut entirely through.

I have provided herein means for automatically rendering the knife-actuating means inoperative when the slits have been cut to the desired depth. The motor herein shown is an electric motor and one convenient way of rendering the knife-actuating mechanism inoperative is to provide means for opening the circuit of the motor when the slits have been cut to the desired depth. I have, therefore, illustrated means actuated by the descending movement of the block 11 as the slits are cut and which functions to open the motor circuit just as the block reaches the lower limit of its movement as determined by the engagement of the wings 18 with the sides 19 of the frame 6.

Another feature of the invention relates to means for automatically starting the motor in operation when an uncut slice of meat has been placed in the machine and the clamping and stripping plate 7 has been closed onto the meat and latched by the latch 9. This is accomplished by providing a circuit-closing-switch for closing the motor circuit which switch is actuated by the closing movement of either the frame 6 or the stripper plate 7. The motor circuit is shown generally at 20 and two switches for controlling the motor circuit are indicated at 21 and 22 respectively. The switch 22 is a circuit-closing switch and the switch 21 is a circuit-opening switch. These switches are shown as of the push button type and are illustrated somewhat conventionally in the drawings. The circuit-closing switch 22 has the push button 24 and the circuit-opening switch 21 has the push button 23. Whenever the push button 24 is depressed the motor circuit will be closed and whenever the push button 23 is depressed the motor circuit will be opened.

The circuit-opening-switch 21 with its push button element 23 is so located that the push button will be engaged by an extension 25 formed on the wing 18 just as the block 11 approaches the lower limit of its movement as determined by the engagement of the wings 18 with the sides 19 of the frame 6 and said push button will be so designed that the snap switch will be actuated just as the block 11 reaches its lowest limit. This will open the motor circuit and bring the motor to rest.

When the motor has thus been stopped the frame 6 may be unlatched and swung upwardly about the pivot 4 either for the purpose of removing the piece of meat or for turning the turntable. When the frame 6 is returned to its operative position shown in Fig. 1 it will engage the push-button 24 of the circuit-closing switch 22 and will throw said switch thereby closing the motor circuit 20 and starting the motor again.

The motor is thus automatically stopped when the slits have been cut and is automatically started again when the frame 6 is swung down into its operative position.

The meat-supporting table 2 is in the form of a turntable and means are provided for automatically turning this table through 90° or some other predetermined angle when the frame 6 is moved upwardly into the dotted-line position Fig. 1 so that after one series of slits has been cut in the meat and the frame 6 is unlatched and swung upwardly into the dotted line position this movement will automatically give the turntable a quarter rotation thus placing the meat in position to have the second series of slits cut.

The table 2 is fast on a shaft 250 journalled in suitable bearings 26 formed by the frame and on the lower end of the shaft is a toothed wheel 27 having four teeth. This wheel cooperates with a pawl 28 carried by a reciprocating slide 29 that reciprocates in bearings 30 carried by the frame. During the reciprocation of the slide 29 to the right (Fig. 3) the pawl will engage one of the teeth of the wheel 27 and give said wheel and shaft 25 a quarter-revolution. This movement of the slide is given to it automatically by the upward swinging movement of the frame 6.

The slide 29 is acted on by a spring 31 which normally holds it in retracted position. 32 indicates a lever pivoted to the frame at 33 and having at its lower end a fork 34 which engages a pin 35 carried by the slide 29. The upper end of this lever is bent forwardly as shown at 36 and is situated to be engaged by the knife block 11 when the frame 6 swings into the dotted line position of Fig. 1. 49 indicates leveling screws which are screw threaded through the base 3 and are adapted to level up the turntable 2.

The frame 6 and plate 7 are acted on by a spring 37 which tends to swing the frame upwardly so that as soon as the frame is unlatched the spring will assist in throwing the frame and knife block upwardly. During this upward movement the plate 7 will engage the end 36 of the lever 32 and swing it backwardly as indicated in dotted lines. This backward movement gives the necessary forward movement to the slide 29 to effect the turning of the turntable through one quarter revolution.

I claim:

1. In a machine for cubing meat, the combination with a meat-supporting table, of a clamping member swingable towards and from the table for clamping a slice of meat to the table, a gang of knives to cut slits in the meat, knife-operating mechanism, said knives moving towards the table during the cutting of the slits, and means actuated by the movement of the knives toward the table to render the knife-operating mechanism inoperative when the slits have been cut to a predetermined depth less than the thickness of the slice of meat.

2. In a machine for cubing meat, the combination with a meat-supporting table, of a clamping member swingable towards and from the table to clamp a slice of meat to the table, a gang of knives to cut slits in the meat, a motor for actuating the knives, said knives moving towards the table during the cutting of the slits, and means actuated by movement of the knives toward the table to render the motor inoperative when the slits have been cut to a predetermined depth.

3. In a machine for cubing meat, the combination with a meat-supporting table, of a clamping member swingable towards and from the table to clamp meat to the table, a gang of knives to cut slits in said meat, an electric motor for operating the knives, a switch controlling the circuit of the motor, when the slits have been cut to the desired depth, said knives moving toward the table during the cutting of the slits, and means actuated by said movement of the knives toward the table to open the switch.

4. In a machine for cubing meat, the combination with a meat-supporting table, of a clamping member swingable towards and from the table to clamp meat to the table, a gang of reciprocatory knives, means to reciprocate the knives thereby to cut slits in the meat, said knives moving toward the table during the cutting of the slits, and means actuated by movement of the knives toward the table when the slits are cut to a predetermined depth to render the knife-operating means inoperative.

5. In a machine for cubing meat, the combination with a meat-supporting table, of a pivoted clamping member for clamping a slice of meat to the table, a gang of knives to cut slits in the meat, a knife-operating motor device for moving the knives across the meat, and means to render said motor device operative by the movement of the clamping member into operative clamping position.

6. In a meat-cubing machine, the combination with a meat-supporting table, of a pivoted clamping member for clamping a slice of meat to the table, a gang of reciprocatory knives arranged to reciprocate in a direction substantially parallel to the table, a motor for reciprocating the knives, and means actuated by the clamping member in moving into clamping position to start the motor in operation.

7. In a meat-cubing machine, the combination with a rotary meat-supporting table, of a pivoted clamping member for clamping a slice of meat to said table, a gang of reciprocatory knives to cut slits in the meat, and means operative with the knives at any point in their reciprocatory movement and operated by the movement of the clamping mmeber into raised position to turn the meat-supporting table.

8. In a machine for cubing meat, the combination with a meat-supporting table, of a pivotally mounted skeleton frame, a clamping plate yieldingly held by said skeleton frame, said plate being provided with slots, a gang of reciprocatory slitting knives, the individual knives occupying said slots, and a motor for reciprocating the knives, said knives being movable towards the meat relative to the frame as they are reciprocated.

9. In a machine of the class described, the combination with a rotary meat-supporting table, of a pivoted clamping member for clamping a slice of meat to said table, a gang of knives to cut slits in the meat, said knives being movable towards the meat relative to the clamping member, a pivoted lever actuated by the movement of the clamping member into raised position, and means to turn the meat-supporting table by the movement of said lever.

10. In a machine of the class described, the combination with a rotary meat-supporting table, of a pivoted clamping member for clamping a slice of meat to said table, a gang of knives to cut slits in the meat, said knives being movable towards the meat relative to the clamping member, a pivoted lever which is given an operative movement by the clamping member when the latter is swung away from the table and a pawl-and-ratchet connection between said lever and the meat-supporting table.

11. In a machine of the class described, the combination with a supporting frame, of a meat-supporting table rotatively mounted thereon, a skeleton frame pivotally mounted to the supporting frame movable toward and from the table, a clamping plate yieldingly held by said skeleton frame, said plate being provided with slots, a gang of reciprocatory slitting knives operating in said slots, said knives being capable of reciprocating movement longitudinally of the slots and also a vertical movement at right angles to said plate, a motor to reciprocate the knives, and means to stop the motor by said vertical movement of the knives.

12. In a machine for cubing meat, the combination with a meat-supporting table, of a pivoted clamping member for clamping a slice of meat to the table, a gang of knives to cut slits in the meat, a motor device for reciprocating the knives, said knives being capable of movement toward the meat relative to the clamping member, and means to render said motor device operative by the movement of the clamping member into operative clamping position.

13. In a machine for cubing meat, the combination with a meat-supporting table, of a pivoted clamping member for clamping a slice of meat to the table, a gang of knives to cut slits in the meat, a motor device for reciprocating the knives, said knives being capable of movement toward the meat relative to the clamping member, means to render said motor device operative by the movement of the clamping member into operative clamping position, and means to render the motor inoperative when the slits have been cut to a predetermined depth.

14. In a meat-cubing machine, the combination with a meat-supporting table, of a pivoted clamping member for clamping a slice of meat to the table, a gang of reciprocatory knives arranged to reciprocate in a direction substantially parallel to the table and to have a movement toward the meat relative to said clamping member, a motor for reciprocating said knives, and means actuated by the clamping member in moving into clamping position to start the motor in operation.

15. In a meat-cubing machine, the combination with a meat-supporting table, of a pivoted clamping member for clamping a slice of meat to the table, a gang of reciprocatory knives arranged to reciprocate in a direction substantially parallel to the table and to have a movement toward the meat relative to said clamping member, a motor for reciprocating said knives, means actuated by the clamping member in moving into clamping position to start the motor in operation, and means to render the motor inoperative when the slits have been cut to a predetermined depth.

JOSEPH P. SPANG.

CERTIFICATE OF CORRECTION.

Patent No. 1,942,499.　　　　　　　　　　　　　　　　January 9, 1934.

JOSEPH P. SPANG.

It is hereby certified that error appears in the printed specification of the above numbered patent requiring correction as follows: Page 2, lines 128 and 129, claim 3, strike out the words and comma "when the slits have been cut to the desired depth," and line 132, after "switch" and before the period insert the words when the slits have been cut to the desired depth; and that the said Letters Patent should be read with this correction therein that the same may conform to the record of the case in the Patent Office.

Signed and sealed this 20th day of February, A. D. 1934.

F. M. Hopkins (Seal)　　　　　　　　　　　　　　　　　　　　　　Acting Commissioner of Patents.